United States Patent
Gordo et al.

[11] Patent Number: 5,361,457
[45] Date of Patent: Nov. 8, 1994

[54] DEVICE FOR DE-LINTING COTTON SEEDS

[76] Inventors: Wladimir P. Gordo, Rua Macedo Soares, 427, Cidade Universitária, Campinas, São Paulo; Mario de Souza N. Pitta, Fazenda Ressaca, Santo Antonio de Posse, Sao Paulo, both of Brazil

[21] Appl. No.: 47,204

[22] Filed: Apr. 16, 1993

[51] Int. Cl.⁵ .............................................. A01G 7/00
[52] U.S. Cl. ............................................. 19/41; 47/5; 241/152.1; 241/163; 241/261.2
[58] Field of Search ...................... 241/152.1, 155, 162, 241/163, 261.1, 261.2; 19/40, 41, 44, 45; 47/5

[56] References Cited

U.S. PATENT DOCUMENTS

| | | |
|---|---|---|
| 44,387 | 9/1864 | Beach . |
| 399,819 | 3/1889 | Baumgarten ............................ 19/41 |
| 431,665 | 7/1890 | Marshall ................................ 19/41 |
| 557,790 | 4/1896 | Faulkner ................................ 19/41 |
| 856,918 | 6/1907 | Schreck ............................. 241/261.2 |
| 2,968,444 | 1/1961 | Jones ................................. 241/261.2 |

FOREIGN PATENT DOCUMENTS

| | | |
|---|---|---|
| 7585 | of 1889 | United Kingdom ................... 19/41 |
| 7949 | of 1895 | United Kingdom ................... 19/41 |

*Primary Examiner*—Henry E. Raduazo
*Attorney, Agent, or Firm*—Beveridge, DeGrandi, Weilacher & Young

[57] ABSTRACT

A device for de-linting cotton seeds is described that is of simple construction, does not damage the seeds and is antipolluent. The device comprises a unit provided with super-imposed discs spaced by a distance of the same order as the larger dimension of an at least partially linted cotton seed, the upper disc being fixed and the lower disc being rotary. Seeds are fed through a central opening in the upper disc and subject to friction between the discs as they migrate outwardly to the periphery where they are discharged and the lint removed is expelled from the device by an exhaustor. The lower discs are coated with a relatively rough surfaced rubber-like material and the lower discs are coated with a similar material formed with a plurality of finger-like projections whereby the seeds are subject to coarse friction from the lower disc while their outward migration is controlled by the retaining fingers. The device may have a plurality of such units in series.

19 Claims, 2 Drawing Sheets

DEVICE FOR DE-LINTING COTTON SEEDS

The present invention refers to a device for de-linting cotton seeds.

It is well known that when cotton is beneficiated the machines used do not remove all of the fibres from the seeds. On the contrary, a considerable quantity of very short fibres or lint remains whereby the seeds are commonly known as "hairy seeds". The presence of lint produces serious problems, particularly because it impedes flow through the seed distribution systems which results in very irregular distribution of the seeds on the ground. This, in its turn, means that during planting there is an excess of seeds in some places and a lack of seeds in others. Excess seeds requires manual thinning and lack thereof requires transplant of shoots, both operations being extremely onerous for the grower.

A variety of cotton seed de-linting devices is known involving different tecniques for removing the lint, for example, the use of concentrated acids, burning and mechanical sawing. Such devices, however, have a number of disadvantages, such as elevated acquisition and operating costs, risks of exposion, the pollution of waterways, lakes, subsoil water levels and of the atmosphere, the prejudicial effect of acids on the seeds, low productivity, precarious finishing and health hazards for to the operators. Moreover, those machines that use acid or burning techniques destroy the lint which means that it cannot be used or commercialized.

Due to the above disadvantages, many growers simply use "hairy seeds" which substantially increases production costs, due to the excessive manpower necessary for thinning or transplant operations.

On the other hand, the use of smooth de-linted seeds provides the grower with greater economy of seeds, improved seed distribution during planting, reduced use of agrochemicals, improved germination and reduced labor costs.

Although cotton seed de-linting machines that overcome the above mentioned disadvantages do not appear to be known, machines exist for peeling castor beans that employ superimposed relatively rotating hard smooth discs between which the beans are squeezed.

According to the present invention a device for de-linting cotton seeds includes a unit provide with upper and lower superimposed discs spaced by a distance of the same order as the larger dimension of an at least partially linted cotton seed, rotary drive means associated with at least one of the discs for imparting relative rotary movement thereto about at least one axis of rotation, cotton seed input means associated with the discs for feeding at least partially linted cotton seeds to the space between the discs substancially along the axis of rotation, seed collection means arranged to collect seeds expelled from the space between the discs at the periphery thereof and linter extraction suction means in communication with said periphery for extraction of linter removed from the seeds.

Preferably, the upper and lower discs which are respectively fixed and rotary have respective lower and upper facing sides made of rubber-like material, the upper facing side of the lower disc comprising a rough friction producing surface and the lower facing side of the upper disc being formed with a multiplicity of small seed retaining protuberances. In use, the outward movement of the seeds under centrifugal forces is decelerated by their being retained between the protuberances or fingers on the upper disc.

In the actually preferred embodiment of this invention, there are three units vertically axially aligned within a cylindrical outer housing, the lower surfaces of the upper discs of the units being identical and the upper surfaces of the lower discs of the upper two units being of a greater roughness than the corresponding surface of the lower disc of the lowermost unit. The seeds expelled from the outer periphery of the disc pair of a higher unit fall through a passage defined by a small spacing betwen such outer periphery and the inner wall of the cylindrical housing, to be caught in an inlet hopper of the unit immediately below.

Such greater roughness may be equivalent to about 30 mesh and the lesser roughness of the lower disc of the lowermost unit being equivalent to about 60 mesh.

The rubber-like material, which may be natural rubber or any other relatively hard resilient rubber-like material, including synthetic material, preferably has a Shore hardness of between 30 and 50, preferably 40.

The lower disc of each unit is preferably provided with a peripheral upstanding ring formed with a plurality of peripherally distributed radial openings for the passage of seeds being expelled from the betwee the upper and lower discs, such ring serving to brake the outward passage of the seeds to ensure greater permanence between the discs.

The linter extraction suction means in each unit preferably comprises an exhaustor mounted in the wall of the cylindrical housing, in communication with a space defined between a lower outer surface of the upper hopper and an upper surface respective inlet hopper and the upper surface of the fixed upper disc.

The invention will be better understood from the following description, given by way of example, of a presently preferred embodiment of the invention, refernce being made to the accompanying drawings in which.

Figure 3:
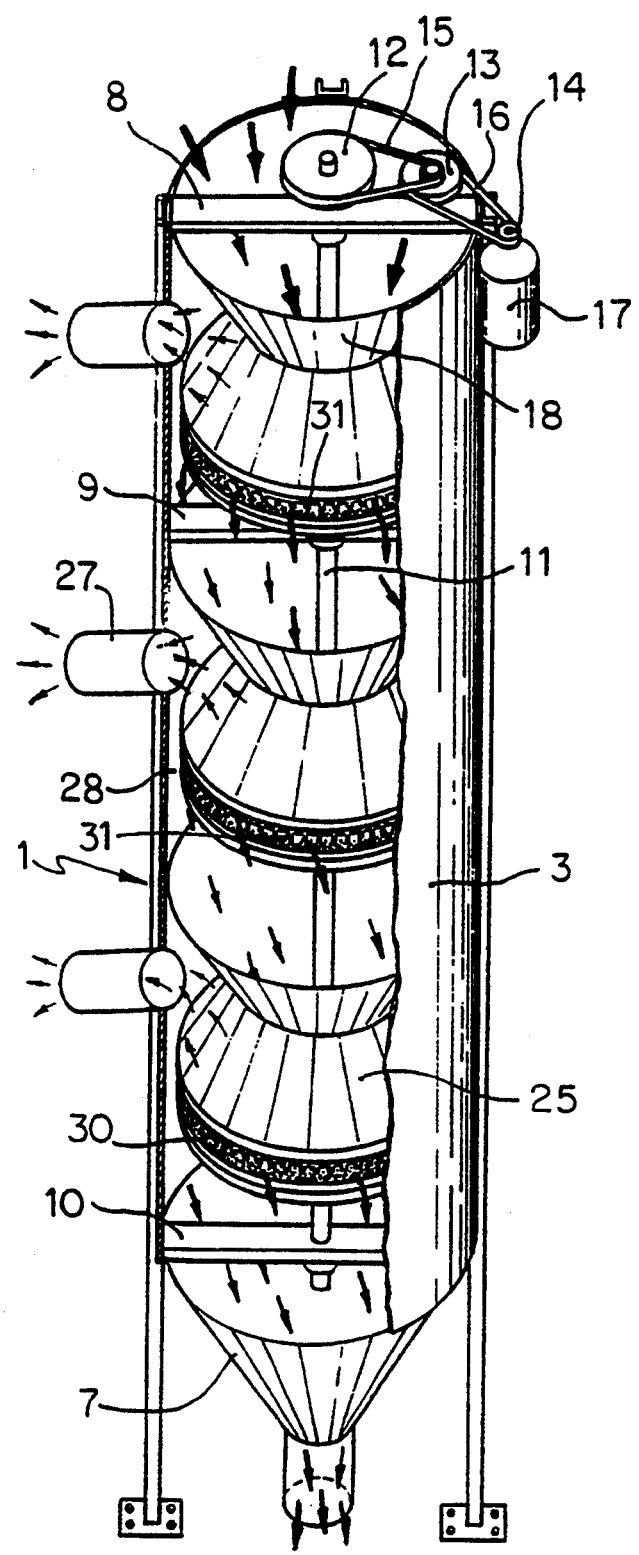
FIG. 3 is a pictorial upper perspective of the machine of FIGS. 1 and 2, indicating the movement of the seeds and the lint during operation.

Referring now to the drawings, a cotton seed de-linting machine according to a presently preferred embodiment of the present invention comprises a vertical structure 1 arranged to be mounted on feet 2. The upper three quarters of the height of the structure 1 is surrounded by a substantially imperforate metal sheet 3 (only partially shown in FIG. 3 to facilitate understanding) to define a cylindrical housing which surrounds a vertical series of three seed de-linting units 4, 5 and 6. Beneath lowermost unit 6 is mounted an output hopper 7 for de-linted seeds.

Three transverse bars 8, 9 and 10 mounted diametrically across structure 1 serve to support a rotary drive shaft 11 at the upper end of which is mounted a drive pulley 12, second and third drive pulleys 13 and 14 and drive belts 15 and 16 transmitting rotation from a motor 17 mounted laterally at the top of structure 1.

Each of the three seed de-linting units 4, 5 and 6 comprises an inlet hopper 18 in the form of an inverted cone having a lower seed outlet orifice 19 of about 22 mm diameter around which is mounted a fixed seed treatment disc 20 having a central seed input orifice precisely in register with orifice 19, the drive shaft 11 passing axially through both the inlet hopper 18 and the fixed disc 20. Immediately below the fixed disc 20, a rotary seed treatment disc 21 is mounted on shaft 11 for rotation therewith by means of an adjustable fixing collar 22. The fixing collor 22 and hence also the lower disc 21 is provided with an adjusting screw (not shown in detail) to permit adjustment of the height of the fixture to shaft 11 and thus to regulate the spacing between fixed and rotary discs 20 and 21.

The lower rotary disc 21 of each unit is provided with a peripheral upstanding ring 23 formed with two peripherally distributed radial openings or windows 24 for the passage of seeds being expelled from the space between the upper and lower discs. Ring 33, which is not shown in FIG. 3 so as facilitate visualisation of the operation of the machine and which may have a greater number of windows 24, three or four for example, serves to decelerate the passage of the seeds out from between the discs so as to increase their permanence in the treatment area between the discs. The outer diameter of the lower disc 21 together with its ring 23 is suitably of a diameter of about 900 mm.

A conical cowling 25, mounted by welding or the like between the outer periphery of each upper fixed disc 20 and an intermediate line around the outer surface of the corresponding inlet hopper 18, defines together with the cylindrical housing sheet 3 and the upper outer part of the hopper an annular lint removal chamber 26. A lint removing suction exhaustor line 27 passes through housing sheet 3 so that lint removed from seeds and being expelled radially from between the fixed and rotary discs may be sucked out of the machine.

It will be noted that the outer periphery of the rotary discs 21 or, more precisely, of upstanding ring 23, is slightly inwardly spaced from the inner surface of housing sheet 3 so as to define a vertical annular passage 28 through which at least partially de-linted seeds may fall into the hopper 18 or 7 immediately below.

Figures 1, 2:
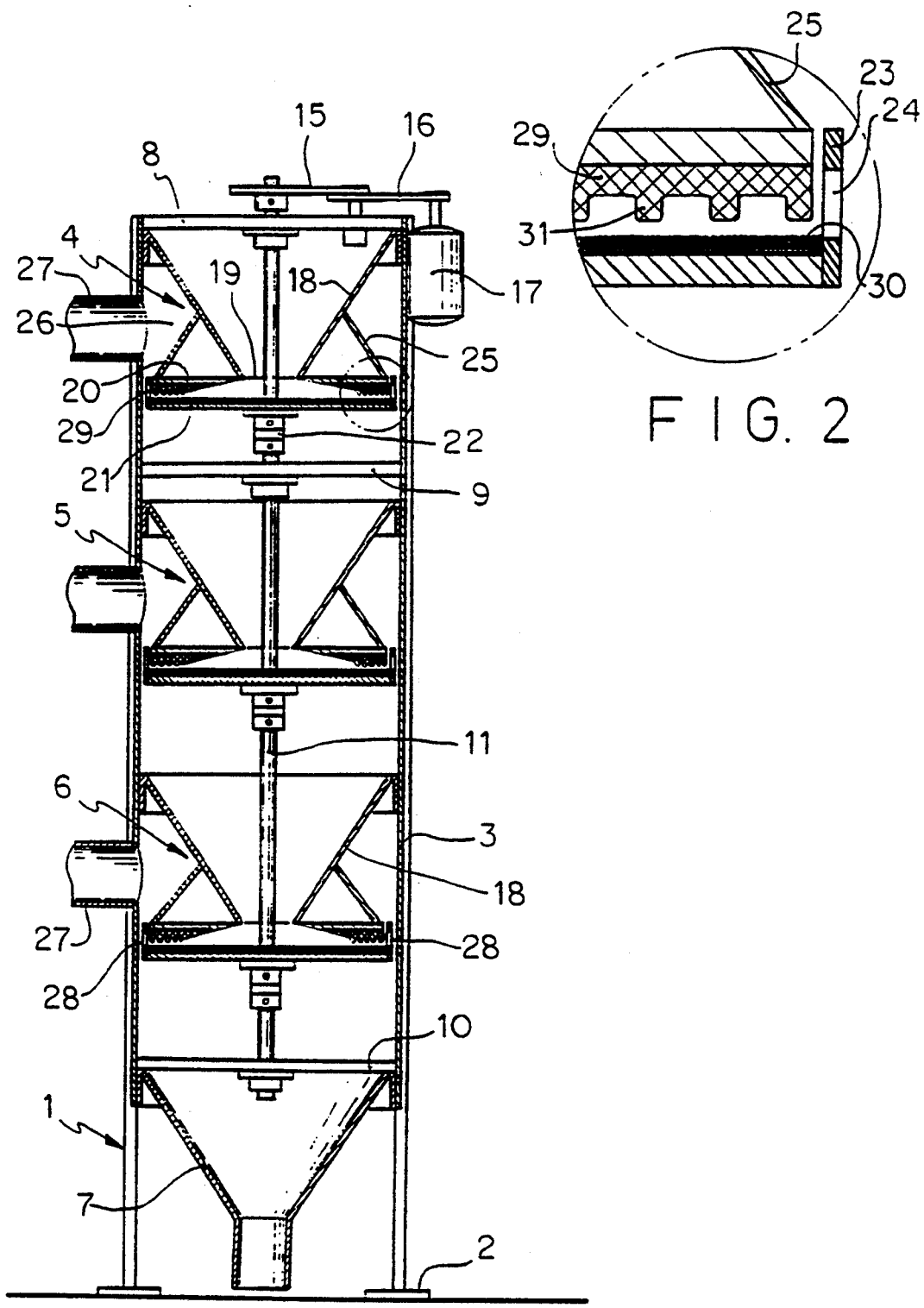
FIG. 1 is an elevational view, partially in section, of a three stage cotton de-linting machine according to a preferred embodiment of the present invention.
FIG. 2 is an enlarged detail of part of the de-linting discs of the uppermost unit of the machine, corresponding to the portion indicated by a circle in FIG. 1.

FIG. 2 is a detail of the upper and lower discs 20 and 21 from which it will be seen that they comprise metal discs coated on their respectively lower and upper facing surfaces with coatings 29 and 30 of a relatively hard rubber-like material. Such material may be natural or synthetic rubber or the like and, in the case of upper discs 20, its hardness on the Shore scale may be between about 30 and 50, preferably 40. Coating 29 is specially formed to have a plurality of protuberances or fingers 31 dimensioned and spaced to retain or brake the cotton seeds being de-linted in their radial progression towards the outer periphery of the discs. It will be understood that such dimensions and spacing will depend mainly on the dimensions of the seeds being de-linted but, as a general rule, generally cylindrical fingers 31 may be used having a height of about 6 mm, a diameter of about 6 mm and a spacing between the outer surfaces of adjacent fingers of about 12 mm.

Also of importance is the spacing between the upper and lower discs 20 and 21. Once more this spacing will depend on the size of the seeds being treated and should be of the order of the larger dimension of a linted cotton seed, being typically of about 10 mm from the bottom of fingers 31 to coating 30. This may mean a spacing of about 4 mm between coating 30 and the free ends of the fingers. This spacing can be regulated, as mentioned above, by means of adjustable collar 22. It will also be observed from FIG. 1 that the inner peripheries of both fixed disc 20 and of its coating 29 are conical so as to induce seeds to enter the space between the discs 20 and 21.

The coating 30 on each lower rotary disc 21 is not smooth, but rather has a roughness corresponding to a sandpaper of about 30 mesh in the cases of the upper two units 4 and 5 and of about 60 mesh in the lowermost unit 6.

In use motor 17 is turned on to rotate shaft 11 and thus also lower rotary discs 21 and "hairy" cotton seeds are poured into uppermost inlet hopper 18 of unit 4. The seeds then pass through hopper outlet 19 and the central inlet orifice in the uppermost fixed disc 20 to fall onto the corresponding rotating disc 21 that has the rougher (30 mesh) coating 30. The seeds are then forced outwardly to be squeezed between the discs 20 and 21 where they are caught between fingers 31 and submitted to coarse frictional contact with coating 30 on the lower disc 21 of unit 4. The centifugal force produced by the rotation of disc 21 impels the seeds outwardly between the discs, the friction with the lower disc stripping lint therefrom, until they reach outer retaining ring 23 where they are held up slightly to increase their permanence time before being thrown outwards against the inner wall of housing plate 3 through the windows 24. The lint that leaves the discs together with the partially de-linted seeds is sucked through the lint removal chamber 26 and out of the machine through exhaustor line 27 of unit 4.

The partially de-linted seeds, on the other hand, fall through peripheral vertical passage 28 and into inlet hopper 18 of unit 5 where they receive an identical treatment which removes additional lint that is removed through corresponding exhaustor line 27 of unit 5, the seeds falling into the inlet hopper 18 of unit 6. Unit 6 differs from units 4 and 5 only in that that coating 30 on lower rotary disc 21 is less rough (60 mesh rather than 30 mesh in the case of units 4 and 5) since at this stage almost all of the lint has been removed and it is not desired to damage the seeds.

The seeds leaving unit 6 fall into outlet hopper 7 from which they may be subjected to final beneficiating steps as are well known in the art, such as passage through a ciclone to remove husks and other unwanted material.

It will be understood that the above description made with reference to the drawings relates to a presently preferred embodiment of the invention. It will be equally understood that the basic concept of this invention could be applied to other machines the details of which differ from that described. For example, it is not essential to have three stages or units, it being possible in certain special cases to use a single unit or, in other cases, to have a machine with four or more units in series.

It will also be noted that in order to remove the lint from the seeds it is important that there is relative rotation between the friction producing upper surface of one disc and the facing seed retaining surface of the other disc. It is not therefore essential that the upper disc be fixed and only the lower one rotary. For example, it would be possible for the upper disc also to rotate, preferably in a direction opposite to the rotation of the lower disc.

In addition, the various stages need not be arranged vertically above one another, although this is presently preferred as a question of economy both of construction and of space. Other manners of exhausting the lint removed from the seeds are also within the skill of a person versed in the art and the specific arrangement with three suction lines could be used with three individual exhaustors or a single exhaustor connected to the three lines, none of this being essential to this invention, the scope of which is defined in the following claims.

I claim:

1. Device for de-linting cotton seeds comprising a unit provided with upper and lower superimposed discs spaced by a distance of the same order as the larger dimension of an at least partially linted cotton seed, rotary drive means associated with at least one of said upper and lower discs for imparting relative rotary movement to said discs about at least one axis of rotation, cotton seed input means associated with said first and second discs for feeding at least partially linted cotton seeds to the space between said discs substantially along said axis of rotation, seed collection means arranged to collect seeds expelled from said space between said discs at the periphery of said discs, and lint extraction suction means in communication with said periphery for extraction of lint removed from said seeds, said upper and lower discs having respective lower and upper facing sides made of rubber-like material, said upper facing side of said lower disc comprising a rough friction producing surface, and said lower facing side of said upper disc being formed with a multiplicity of small protuberances.

2. Device according to claim 1, in which said upper disc is fixed against rotation and coaxial with said lower disc, said rotary drive means being connected to rotate said lower disc.

3. Device according to claim 2, in which said cotton seed input means includes a central opening in said upper disc.

4. Device according to claim 1, in which said rough surface has a roughness equivalent to 30 mesh.

5. Device according to claim 1, in which said protuberances are dimensioned to retain therebetween individual at least partially linted cotton seeds.

6. Device according to claim 5, in which said protuberances are spaced from each other by distances of about 6 mm, have diameters of about 12 mm and have heights of about 6 mm.

7. Device according to claim 1, in which said rubber-like material has a Shore hardness in the range of 30 to 50.

8. Device according to claim 1, including a plurality of said units in series, said seed collection means of an earlier one of said units in said series comprising said seed input means of an immediately subsequent one of said units.

9. Device according to claim 8, in which there are three said units, the upper discs of said units being identical, the lower discs of the first two said units in the series being of a greater roughness and the third of said units being of a lesser roughness.

10. Device according to claim 9 in which said greater roughness is equivalent to about 30 mesh and said lesser roughness is equivalent to about 60 mesh.

11. Device according to claim 8, in which said lower disc of each said unit is provided with a peripheral upstanding ring formed with a plurality of peripherally distributed radial openings for the passage of seeds being expelled from between said upper and lower discs.

12. Device according to claim 8, in which said rotary drive means is common to all of said plurality of units, said units being aligned vertically.

13. Device according to claim 12, in which said seed input means of each unit comprises a hopper arranged concentrically above said upper and lower discs and a central opening in said lower disc, each said upper disc being fixed against rotation and having an under side made of rubber-like material formed with a multiplicity of finger-like projections for retaining cotton seeds and each of said lower discs being rotatable by said common rotary drive means and having a rough upper surface made of rubber-like material, said rubber-like material having a Shore hardness in the range of 30 to 50.

14. Device for de-linting cotton seeds comprising a vertical outer cylindrical housing containing three vertically axially arranged aligned units, each said unit being provided with:

an upper seed input hopper having a lower central seed outlet;

a fixed upper disc formed with a central seed input orifice in registry with said seed outlet, said upper disc having a lower surface of a rubber-like material formed with a plurality of cotton seed retaining fingers;

a lower rotatable disc coaxial with said fixed upper disc and spaced therefrom by a distance of the same order as the larger dimension of an at least partially linted cotton seed, said lower disc having an outer periphery inwardly spaced from an inner wall of said cylindrical housing by a distance greater than the larger dimension of an at least partially linted cotton seed, said lower disc having a rough friction producing upper surface of rubber-like material;

a vertical drive shaft passing concentrically through said hopper seed outlet and said seed input orifice of each of said three units and being fixed to said lower rotary disc of each said unit;

drive means arranged to rotate said drive shaft; and linter extraction suction means in communication with a space defined between a lower outer surface of said upper hopper and an upper surface of said fixed upper disc;

said device being further provided with seed collection means beneath the lowest of said units in said cylindrical housing.

15. Device according to claim 14, in which said lower disc of each said unit is provided with a peripheral upstanding ring formed with a plurality of peripherally distributed radial openings for the passage of seeds being expelled from between said upper and lower discs.

16. Device according to claim 14, in which said upper discs of said units are identical and the lower discs of the first two said units in the series being of a greater roughness and the third lowermost of said units being of a lesser roughness.

17. Device according to claim 16, in which said greater roughness is equivalent to about 30 mesh and said lesser roughness is equivalent to about 60 mesh.

18. Device for de-linting cotton seeds comprising a unit provided with upper and lower superimposed discs spaced by a distance of the same order as the larger dimension of an at least partially linted cotton seed, said upper disc being fixed against rotation and coaxial with said lower disc, rotary drive means connected to said lower disc to rotate said lower disc about at least one axis of rotation, cotton seed input means associated with said first and second discs for feeding at least partially linted cotton seeds to the space between said discs substantially along said axis of rotation, input means including a central opening in said upper disc, seed collection means arranged to collect seeds expelled from said space between said discs at the periphery of said discs, and lint extraction suction means in communication with said periphery for extraction of lint removed from said seeds, said upper and lower discs having respective lower and upper facing sides made of rubber-like material, said upper facing side of said lower disc comprising a rough friction producing surface and said lower facing side of said upper disc being formed with a multiplicity of small protuberances.

19. Device for de-linting cotton seeds comprising a vertical outer cylindrical housing containing three vertically axially arranged aligned units, each said unit being provided with:

an upper seed input hopper having a lower central seed outlet;

a fixed upper disc formed with a central seed input orifice in registry with said seed outlet, said upper disc having a lower surface of a rubber-like material formed with a plurality of cotton seed retaining fingers;

a lower rotatable disc coaxial with said fixed upper disc and spaced therefrom by a distance of the same order as the larger dimension of an at least partially linted cotton seed, said lower disc having a rough friction producing upper surface of rubber-like material, said lower disc being provided with a peripheral upstanding ring formed with a plurality of peripherally distributed radial openings for the passage of seeds being expelled from between said upper and lower discs, said lower disc having an outer periphery inwardly spaced from an inner wall of said cylindrical housing by a distance greater than the larger dimension of an at least partially linted cotton;

a vertical drive shaft passing concentrically through said hopper seed outlet and said seed input orifice of each of said three units and being fixed to said lower rotary disc of each said unit;

drive means arranged to rotate said drive shaft; and, linter extraction suction means in communication with a space defined between a lower outer surface of said upper hopper and an upper surface of said fixed upper disc;

said device being further provided with seed collection means beneath the lowest of said units in said cylindrical housing.

* * * * *